(12) United States Patent
Nakajima et al.

(10) Patent No.: US 7,978,930 B2
(45) Date of Patent: Jul. 12, 2011

(54) WIDE-FIELD IMAGE INPUT METHOD AND DEVICE

(75) Inventors: Noboru Nakajima, Tokyo (JP); Akihiko Iketani, Tokyo (JP)

(73) Assignee: NEC Corporation, Tokyo (JP)

( * ) Notice: Subject to any disclaimer, the term of this patent is extended or adjusted under 35 U.S.C. 154(b) by 1107 days.

(21) Appl. No.: 11/631,879

(22) PCT Filed: Jul. 1, 2005

(86) PCT No.: PCT/JP2005/012212
§ 371 (c)(1),
(2), (4) Date: Jan. 8, 2007

(87) PCT Pub. No.: WO2006/004043
PCT Pub. Date: Jan. 12, 2006

(65) Prior Publication Data
US 2008/0031543 A1    Feb. 7, 2008

(30) Foreign Application Priority Data

Jul. 7, 2004    (JP) ................. 2004-200893

(51) Int. Cl.
G06K 9/36      (2006.01)
G06K 9/54      (2006.01)
H04N 7/00      (2011.01)
H04N 5/225     (2006.01)

(52) U.S. Cl. ...... 382/284; 382/305; 348/36; 348/207.99

(58) Field of Classification Search ............ 382/254, 382/274–276, 284, 285, 291, 305, 312; 348/36–39, 348/175, 207.99; 250/221; 340/5.81, 5.82; 315/154
See application file for complete search history.

(56) References Cited

U.S. PATENT DOCUMENTS
5,692,061 A  * 11/1997 Sasada et al. .......... 382/106
7,180,050 B2 *  2/2007 Imagawa et al. ........ 250/221

FOREIGN PATENT DOCUMENTS
| | | |
|---|---|---|
| JP | 06-141228 | 5/1994 |
| JP | 08-223481 | 8/1996 |
| JP | 11-298837 | 10/1999 |
| JP | 11-352568 | 12/1999 |
| JP | 2003-264733 | 9/2003 |
| JP | 2004-096156 | 3/2004 |
| JP | 2005-260666 | 9/2005 |

OTHER PUBLICATIONS

Zelnick Manor and Irani, "Multi-Frame Estimation of Planar Motion", IEEE Transactions on Pattern Analysis and Machine Learning, vol. 22, No. 10 (2000).

* cited by examiner

*Primary Examiner* — Kanji Patel
(74) *Attorney, Agent, or Firm* — Scully, Scott, Murphy & Presser, P.C.

(57) ABSTRACT

A wide-field image input device that joins a series of partial images obtained by continuously imaging an imaging object by an imaging device while the imaging device is manually scanned by a user, thereby generating a wide-field image, includes: a camera position/posture estimation unit for receiving a partial image series and calculating a change state of three-dimensional position and posture of the imaging device as time-series camera position/posture information; a deformation parameter estimation unit for calculating a geometrical deformation parameter between adjacent partial images from the camera position/posture information; an image joining unit for joining the partial images by using the geometrical deformation parameter so as to generate a wide-field image; and a camera scan error detection unit for detecting motion of the imaging device according to the camera position/posture information and outputting a camera scan error detection signal when an error is detected.

14 Claims, 4 Drawing Sheets

WIDE-FIELD IMAGE INPUT METHOD AND DEVICE

TECHNICAL FIELD

The present invention relates to a wide-field image input method and device for jointing a plurality of images that are taken, in order to generate a wide-field image, when the number of pixels and the angle of view in an imaging apparatus are smaller than those that are originally required.

BACKGROUND ART

When a paper surface, such as magazines, newspapers, and books, is imaged by an imaging device, e.g. camera, there is a case where the number of pixels in an image pickup element device is insufficient to image a desired range on the paper surface in a desired resolution. In this case, it is proposed that the camera images an object while scanning the object as licking and a plurality of frame images that are taken are jointed, thereby generating a wide-field image in high resolution.

Japanese Patent Laid-Open Application No. 11-298837 (JP, 11-298837A) proposes an image input device used in a case where images (partial images) of adjacent scenes are joined to generate a piece of image. The image input device detects an overlapped region based on a motion vector between taken partial images, and when the overlapped region has an area sufficient to calculate an amount of geometrical correction for joining the partial images without a sense of incompatibility, that effect is displayed on an indicator. A user can determine, from the indication, whether a joined image in a sufficient quality with inconspicuous boundaries between partial images is taken or not. Also, Japanese Patent Laid-Open Application No. 2004-96156 (JP, 2004-096156A) proposes an image input system for showing the resultant joined image to the user on an imaging site, in order to allow immediate confirmation whether images can be combined easily or not, i.e., whether failure or non-failure of imaging, on the imaging site. A user can determine, from the presented image, whether the joined image in the sufficient quality with inconspicuous boundaries between partial images can be taken or not.

Now, when the plurality of partial images is joined to generate a wide-field image, the number of samples per a unit length, i.e., resolution, in each partial image varies in accordance with a distance between the camera and the object. For that reason, when the distance between the camera and the object varies, the wide-field image obtained by joining has different resolutions in different portions.

Although the method is proposed in which the geometrical distortion between partial images caused by the tilt of the camera by hand shakes and variations in the distance are corrected and the partial images are then joined, the joined image that is combined in this way includes partial blurry portions. Further, when the camera is tilted even in one partial image, the image that has ubiquitously different resolutions is taken and resolution variations occur in the joined image. This problem occurs more remarkably, when a relatively close object is imaged by manual camera scan (i.e., the object is scanned while the camera is moved), for example, the paper surface of newspapers or magazines is imaged, namely, when the object is close to the camera and is imaged at a wide-angle. In this description, the manual camera scan means that the object is scanned while a camera is held by hands and is moved.

Specifically, the techniques disclosed in JP, 11-298837A and JP, 2004-96156A described above target a use for panoramically imaging a distant view. In this use, though wobbling such as infinitesimal tilts caused by hand shakes or the like occurs in the camera motion while the camera is manually panned to take an image, the object is imaged within a level in which the object moves somewhat in parallel on the image. Therefore, hand shakes or the like have little effects on degradations in the image quality of partial images that are taken and mosaic images that are generated. However, when an object relatively close to the camera is imaged, hand shakes or the like have a profound effect. In other words, a wide-field image in partially low resolution with blurring is generated. Further, when the camera is excessively tilted, the image is taken in a manner that the paper surface has different resolutions in different points in spite of one partial image.

The method is proposed in which, even if shakes occur in the camera motion, a distortion parameter between partial images is estimated and the partial images are accurately positioned, thereby generating a mosaic image with inconspicuous joining points. However, no method is carried out such that user's camera scan is guided so as not to generate resolution variations on the mosaic image. The mosaic image is an image that a character or the like in a printed-paper, such as newspapers and magazines, is microscopically shown as mosaic.

Further, in order to solve these problems, when the camera scanning method is guided to the user so that a wide-field image can be generated in a desired quality, it is difficult to provide how the position and the orientation of the camera are corrected, for a user by an instinctive method. As its reason, in the conventional panoramic imaging to take a distant scene as an object, as described above, variations in the image caused by shakes, e.g., the rotation and the positional change of the camera, are levels in that the object slightly rotates and moves in parallel. However, in a close scene, when the camera is tilted, the object is distorted, and when the distance between the camera and the object changes even slightly, the size is changed and imaged. The tilt and position change of the camera have a large effect on the resolution of the partial image. It is difficult for the user to immediately grasp whether the camera has to be rotated or the position has to be moved when the camera scan is corrected.

Figure 1:
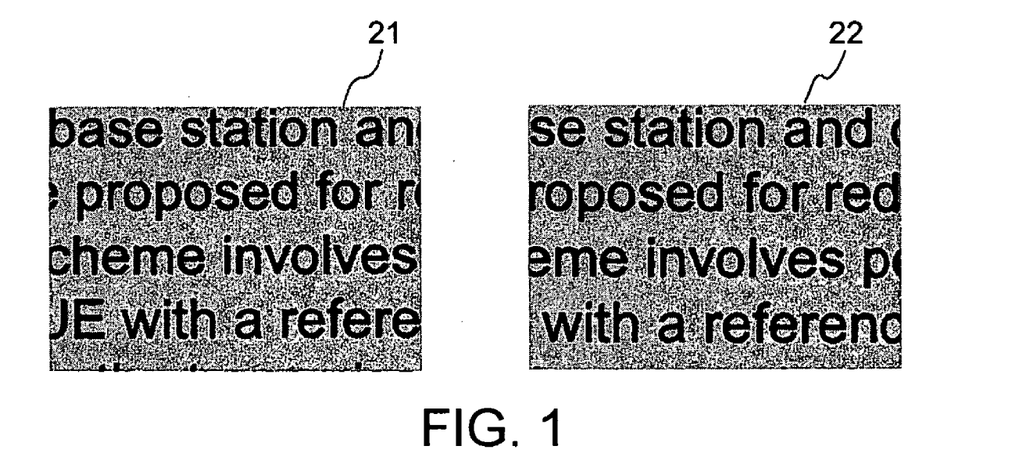
FIG. 1 is a view showing an example of partial images that are adjacent in time in a partial image series.
Figure 2:
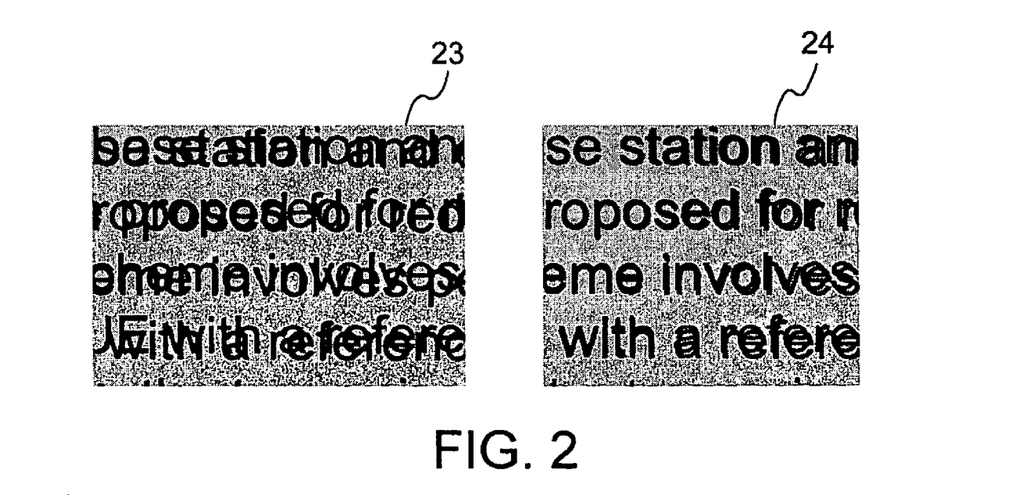
FIG. 2 is a view showing an example of guiding user's camera scan by superimposing two images.

FIG. 1 shows two images taken while scanning the same object. Assuming that image 21 shown on the left side is a reference image and image 22 shown on the right side is an image that is currently taken. Considerations are given to a case where it is necessary to correct the position and posture of the camera so that these images can be accurately positioned. In this case, it is difficult for the user to immediately grasp whether the camera has to be rotated or the position has to be moved. As a method of directing the user to make alignment, there is a method in which the reference image that has been taken is translucently superposed on an image that will be taken and the camera is moved to the position and posture to align them, like two examples shown in FIG. 2. However, it is difficult for the user to immediately grasp which direction and how much the position and posture of the camera are corrected only by referring to the superimposed image shown in FIG. 2. In FIG. 2, image 23 on the left side is an image in which a previous frame image is superimposed on the image that is currently taken, and image 24 on the right side is an image in which the previous frame image is slightly shifted and superimposed on the image that is currently taken.

[Patent Document 1] JP, 11-298837A
[Patent Document 2] JP, 2004-096156A

[Non-Patent Document 1] Zelnik-Manor and Irani, "Multi-Frame Estimation of Planar Motion," *IEEE Transactions on Pattern Analysis and Machine Learning*, Vol. 22, No. 10, (2000)

DISCLOSURE OF INVENTION

Problems to be Solved by Invention

It is an object of the present invention to provide a wide-field image input device that can stably input a high-definition wide-field image over the number of pixels in an image pickup element device and that can guide the manual scan for the imaging device by an intuitive method to enable a high-definition wide-field image to be input.

It is another object of the present invention to provide a wide-field image input method that can stably input a high-definition wide-field image over the number of pixels in an image pickup element device and that can guide the manual scan for the imaging device by an intuitive method to enable a high-definition wide-field image to be input.

Means for Solving the Problem

The first object of the present invention is attained by a wide-field image input device that joins a series of partial images obtained by continuously imaging an imaging object by an imaging device while the imaging device is manually scanned by a user, thereby generating a wide-field image, the device including: camera position/posture estimation means for receiving a partial image series including the series of partial images, and calculating the change state of the three-dimensional position and posture of the imaging device as time-series camera position/posture information; deformation parameter estimation means for calculating a geometrical deformation parameter between adjacent partial images in the partial image series from the camera position/posture information; image joining means for joining the partial images while a deformation between the partial images is corrected by using the geometrical deformation parameter so as to generate a wide-field image; and camera scan error detection means for detecting motion of the imaging device according to the camera position/posture information, and outputting a camera scan error detection signal when an error is detected in the motion of the imaging device.

The first object of the present invention is also attained by a wide-field image input device including: an imaging device for continuously imaging an imaging object while the imaging object is manually scanned by a user, thereby obtaining a partial image series including a series of partial images; camera position/posture estimation means, based on the partial image series, for calculating the change state of the three-dimensional position and posture of the imaging device as time-series camera position/posture information; deformation parameter estimation means for calculating a geometrical deformation parameter between adjacent partial images in the partial image series from the camera position/posture information; image joining means for joining the partial images while a deformation between the partial images is corrected by using the geometrical deformation parameter so as to generate a wide-field image; and camera scan error detection means for detecting motion of the imaging device according to the camera position/posture information and outputting a camera scan error detection signal when an error is detected in the motion of the imaging device.

The second object of the present invention is attained by a wide-field image input method that joins a series of partial images obtained by continuously imaging an imaging object by an imaging device while the imaging device is manually scanned by a user, thereby generating a wide-field image, the method including the steps of: receiving a partial image series including the series of partial images and calculating the change state of the three-dimensional position and posture of the imaging device as time-series camera position/posture information; calculating a geometrical deformation parameter between adjacent partial images in the partial image series from the camera position/posture information; joining the partial images while a deformation between the partial images is corrected by using the geometrical deformation parameter so as to generate a wide-field image; and detecting motion of the imaging device according to the camera position/posture information and outputting a camera scan error detection signal when an error is detected in the motion of the imaging device.

According to the present invention, while the series of images is taken with the imaging device, e.g., a camera, by the user, when there is a possibility in that the quality of images degrades caused by user's scanning mistake such as that the camera is significantly tilted or the distance from the imaging object is remarkably varied, that effect can be notified to the user before such a scanning mistake is taken. Accordingly, the deterioration in the quality of mosaic images caused by user's scanning mistake is reduced, and a wide-field image can be obtained in a stable image quality.

The wide-field image input device according to the present invention always monitors locus information and posture information of the camera, it can be grasped which direction and how much the position and posture of the camera are corrected when a scan error occurs. Accordingly, an appropriate instruction can be given to the user. Also, it can be intelligibly guided to the user how the object is scanned by imaging device, i.e., the camera in order to generate a high-definition wide-field image effectively.

EXPLANATION OF REFERENCE NUMERALS

| | |
|---|---|
| 1 | Imaging device |
| 2 | Camera position/posture estimation unit |
| 3 | Deformation parameter estimation unit |
| 4 | Wide-field image storage unit |
| 5 | Image joining unit |
| 6 | Camera scan error detection unit |
| 7 | Camera position/posture indication unit |
| 8 | Absolute distance acquirement unit |
| 9 | Blurring correction unit |

BEST MODE FOR CARRYING OUT THE INVENTION

First Embodiment

Figure 3:
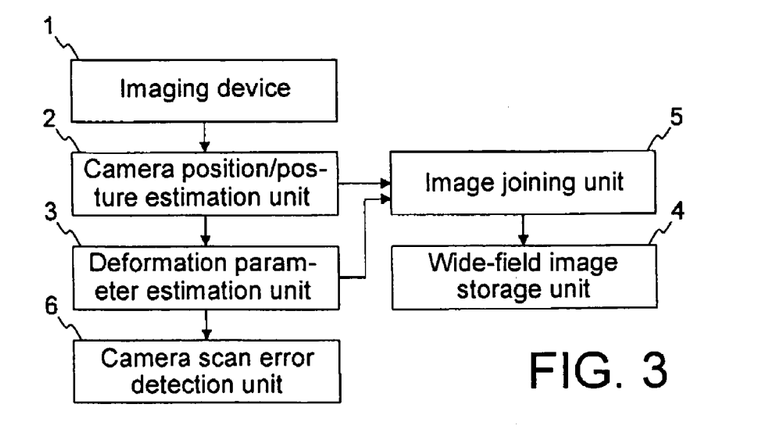
FIG. 3 is a block diagram showing a configuration of a wide-field image input device according to a first embodiment of the present invention.

FIG. 3 shows a wide-field image input device according to the first embodiment of the present invention. The wide-field image input device joins a plurality of partial images obtained by imaging device 1, thereby generating a wide-field image. In the present embodiment, a user uses imaging device 1 to image a scene as an object by manually scanning imaging device 1. Imaging device 1 continuously images the object at a desired angle of field, a desired position, and a desired posture and obtains a partial image series including a series of digitized partial images. Imaging device 1 is embodied by, for example, a camera, in particular, by an imaging unit in the camera.

The wide-field image input device is provided with camera position/posture estimation unit 2, deformation parameter estimation unit 3, wide-field image storage unit 4, image joining unit 5, and camera scan error detection unit 6. Camera position/posture estimation unit 2 receives the digitized partial image series from imaging device 1 and calculates the change state of the three-dimensional position and posture of the camera (imaging device 1) as time-series camera position/posture information, based on the received partial image series. Deformation parameter estimation unit 3 calculates a geometrical deformation parameter between adjacent partial images in the partial image series from the camera position/posture information or the partial image series, or from both of them. Wide-field image storage unit 4 stores the generated wide-field image.

Image joining unit 5 receives a series of geometrical deformation parameters from deformation parameter estimation unit 3 and receives the partial image series supplied from imaging device 1 through camera position/posture estimation unit 2, joins the partial images while correcting deformations between partial images to generate a wide-field image, and outputs the generated wide-field image to wide-field image storage unit 4. The deformations between partial images mean changes between corresponding portions in adjacent partial images.

Camera scan error detection unit 6 receives the camera position/posture information through deformation parameter estimation unit 3 and detects an error in the camera motion based on the received camera position/posture information, and provide an instruction to urge the user to correct the camera scan as a camera scan error detection signal when the error is detected. The error in the camera motion includes, for example, that the tilt angle of the camera is too large or the distance between the camera and the object is too large. Incidentally, in the present embodiment and the subsequent other embodiments, "camera" is preferably configured by integrating imaging device 1 and the wide-field image input device. In other words, imaging device 1 is preferably a constitutional element of the wide-field image input device. When imaging device 1 and the wide-field image input device are integrated to constitute a camera, the camera motion error is synonymous with the motion error in imaging device 1. The tilt and orientation of the camera are represented by, for example, the tilt and orientation of an optical axis of a lens provided in imaging device 1. Additionally, according to the present invention, imaging device 1 may be separated from the wide-field image input device in order to use a commercial camera or the like as the imaging device.

Next, the operation of this wide-field image input device is explained.

The user scans the object by imaging device 1 in arbitrary motion such that the object is imaged as a whole. As a result, the partial image series is supplied from imaging device 1. In this case, imaging device 1 may be any device, for example, devices such that to take moving pictures is started by the user operation of instructing the imaging startup, such that images are continuously taken, and such that a series of still images are obtained whenever an imaging button is pushed. Imaging device 1 may output images other than those at the original imaging timing to camera position/posture estimation unit 2 when images are continuously taken and still images are taken.

Camera position/posture estimation unit 2 receives a moving picture or a still image series supplied from imaging device 1 as the partial image series, determines how the object is imaged while being moved and deformed on the image, and calculates the change in the position and posture of the camera relative to the object. A time-series of the posture and position of the camera is called camera position/posture information $P=\{X_1, X_2, X_3, \theta_1, \theta_2, \theta_3\}$. The fiducial point of the camera position/posture information may be any point in the three-dimensional space. For example, a coordinate on the joined image plane corresponding to the image center of the first frame may be used as the fiducial point. Then, the camera position/posture information may be represented by the optical central position of the camera (camera position) and the angle between the optical axis of the camera and each coordinate axis (camera posture) when the horizontal, vertical, and normal directions from the fiducial point are respectively set as the coordinate axes.

Camera position/posture estimation unit 2 detects how arbitrary four or more points on the taken image move in the following frame image, thereby calculating the change in the posture and position of the camera. When a point in an image is given, a point that is to be detected in the following frame image is called a corresponding point. For example, a pattern in a rectangular region around a point $(x_1, y_1)$ as the center on the partial image is used as a template, the template image is searched on the following partial image, and a point $(x_1', y_1')$ that is most matched is set as the corresponding point of point $(x_1, y_1)$.

As one example, assuming that the above-mentioned process is executed to different four points on the image, four points $((x_1, y_1), (x_2, y_2), (x_3, y_3), (x_4, y_4))$ on the image respectively move to $((x_1', y_1'), (x_2', y_2'), (x_3', y_3'), (x_4', y_4'))$ on the following image. When a projection transformation matrix between images is represented by H, H is represented as follows $$H=[[h_{11}h_{12}h_{13}][h_{21}h_{22}h_{23}][h_{31}h_{32}h_{33}]].$$

When each element in projection transformation matrix H is normalized to satisfy $h_{33}=1$, is arranged one-dimensionally, and is represented in a vector, the matrix is obtained by $$H=[h_{11}h_{12}h_{13}h_{21}h_{22}h_{23}h_{31}h_{32}1]^T=G^{-1}\cdot U.$$

Here, $$h_{33} = 1,$$

$$U = [x_1\ x_2\ x_3\ x_4\ y_1\ y_2\ y_3\ y_4]^T,$$

$$G = \begin{bmatrix} x'_1 & y'_1 & 1 & 0 & 0 & 0 & -x_1\cdot x'_1 & -x_1\cdot y'_1 \\ x'_2 & y'_2 & 1 & 0 & 0 & 0 & -x_2\cdot x'_2 & -x_2\cdot y'_2 \\ x'_3 & y'_3 & 1 & 0 & 0 & 0 & -x_3\cdot x'_3 & -x_3\cdot y'_3 \\ x'_4 & y'_4 & 1 & 0 & 0 & 0 & -x_4\cdot x'_4 & -x_4\cdot y'_4 \\ 0 & 0 & 0 & x'_1 & y'_1 & 1 & -y_1\cdot x'_1 & -y_1\cdot y'_1 \\ 0 & 0 & 0 & x'_2 & y'_2 & 1 & -y_2\cdot x'_2 & -y_2\cdot y'_2 \\ 0 & 0 & 0 & x'_3 & y'_3 & 1 & -y_3\cdot x'_3 & -y_3\cdot y'_3 \\ 0 & 0 & 0 & x'_4 & y'_4 & 1 & -y_4\cdot x'_4 & -y_4\cdot y'_4 \end{bmatrix}.$$

Camera position/posture estimation unit 2 can obtain H by the least square method when the number of corresponding points are large on the image. External parameter matrix $M_1$ of the camera at this time is obtained by $$M_1 = M_0 \cdot H_{01}.$$

In this equation, $M_0$ corresponds to the camera position/posture information of the first frame, and when measurement is difficult, $P_0 = [0, 0, 1, 0, 0, 0]$ or the like may be used instead of $M_0$. $H_{01}$ is projection transformation matrix H between images of the first frame and the following frame. Also, external parameter matrix M of an arbitrary frame is obtained by $$M = M_0 \cdot H.$$

In this situation, assuming that matrix H is a projection transformation matrix between images of the first frame and that frame. In this case, using elements in camera position/posture information P, M is represented by $$M = \begin{bmatrix} \cos\theta_1\cdot\cos\theta_3 + \sin\theta_1\cdot\sin\theta_2\cdot\sin\theta_3 & \sin\theta_1\cdot\cos\theta_2 & X_1 \\ -\sin\theta_1\cdot\cos\theta_3 & \cos\theta_1\cdot\cos\theta_2 & X_2 \\ \cos\theta_2\cdot\sin\theta_3 & -\sin\theta_2 & X_3 \end{bmatrix}.$$

Therefore, elements in P can be obtained, as appropriate. Camera position/posture estimation unit 2 repeatedly calculates camera position/posture information P, which can be obtained, e.g., by the above-mentioned method, whenever a partial image is supplied, and outputs camera position/posture information P to deformation parameter estimation unit 3 and camera scan error detection unit 6 whenever it is calculated.

Deformation parameter estimation unit 3 receives the partial image or the camera position/posture information, or both of them as an input, and calculate a geometrical deformation parameter for correcting the geometrical deformation in the partial images in order to join the partial images without feeling abnormality. Assuming that the object is a plane, when the partial image series is input, eight parameters are estimated while the geometrical deformation between the partial images is regarded as the plane projection transformation. When the plane on which the joined image is generated is known, it may be calculated as the projection transformation parameter between the joined plane and the plane. By observing images of several frames, the orientation of the object plane can be known.

When the camera position/posture information is input, similarly, the plane projection transformation parameter to the joined image plane can be calculated easily. When the camera position/posture information and the partial image are available, deformation parameter estimation unit 3 may apply the plane projection transformation parameter obtained from the camera position/posture information to the partial image and make a calculation to improve the accuracy of the plane projection transformation parameter in which errors on the joined image plane are corrected. Alternatively, projection transformation matrix H obtained in the process of calculating camera position/posture information P in camera position/posture estimation unit 2 may be used as the geometrical transformation parameter, as it is.

Image joining unit 5 applies the geometrical deformation parameter supplied from deformation parameter estimation unit 3 to the partial image supplied from imaging device 1 through camera position/posture estimation unit 2 and writes the resultant image into a predetermined position as a wide-field image so as to execute joining. At this time, the blending process may be applied, using the known mixture ratio, to overlapped portions between the wide-field image that is completely generated and the partial image that is supplied while being geometrically deformed.

Camera scan error detection unit 6 always monitors the camera position/posture information supplied from camera position/posture estimation unit 2. When the camera moves away from the object farther than a preset value, compared with the initial camera position and posture, or when the pan angle and the tilt angle are larger than preset values, that is regarded as a camera scan mistake and a camera scan error detection signal is output. Notification is given to the user in accordance with output of the camera scan error detection signal. For example, when variations in the resolution of the joined image are set on the order of 10 percent of the maximum resolution, the tolerance for variations in the distance between the camera and the object is set such that the ratio with the distance from the initial frame is within 1.1, and when the angle of field is 20 degrees, the tolerance for variations in the angel is within approximately 22 degrees. Camera scan error detection unit 6 outputs the camera scan error detection signal when it is detected that the variations in the distance and the variations in the angle exceed the tolerances. Actually, when the distance ratio or the angle reaches the upper limit of the above-mentioned tolerance, the variations in the resolution reach the limit of the tolerance at that time. Therefore, notification may be given before reaching the upper limit. For example, when warning is given at 70 percent of the variation amount, i.e., 70 percent of the tolerance, concerning both the distance ratio and the angle, the thresholds thereof are 1.07 and 15.4 degrees.

Also, joining the images using the partial image series or the camera position/posture information input from imaging device 1 is previously suspended, and the joining may be started when a predetermined time elapses or when it is confirmed that the accuracy of the orientation of the object plane can be obtained.

According to the wide-field image input device of the first embodiment, it is possible to inform the user of the deterioration in the quality of mosaic images caused by user's mistake on the camera scanning such as that the camera is remarkably tilted or the distance from the object changes significantly before the scan mistake apt to cause the deterioration is taken.

Second Embodiment

Figure 4:
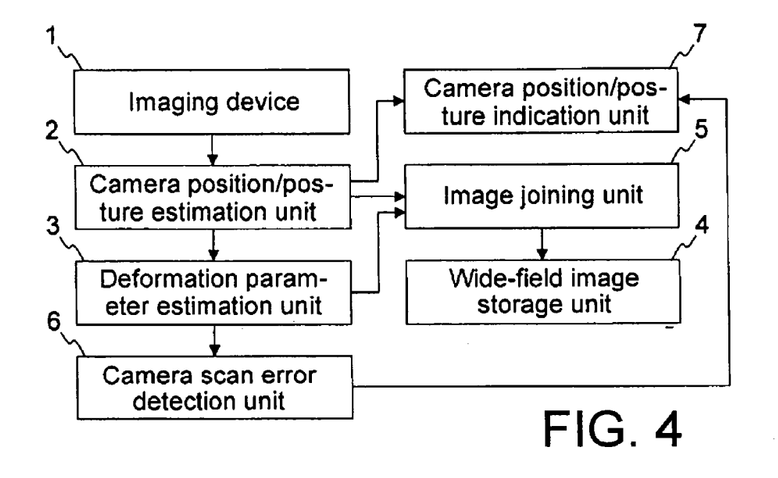
FIG. 4 is a block diagram showing a configuration of a wide-field image input device according to a second embodiment of the present invention.

FIG. 4 shows a wide-field image input device according to the second embodiment of the present invention. The wide-field image input device shown in FIG. 4 is configured by adding camera position/posture indication unit 7 to the wide-field image input device according to the first embodiment. Camera position/posture indication unit 7 receives the camera scan error signal from camera scan error detection unit 6 and the camera position/posture information from camera position/posture estimation unit 2. Preferably, the camera scan error signal is camera scan error information including information which scan error occurs.

Camera position/posture indication unit 7 performs one or more of the following four processes (a) to (d) of:

(a) visually indicating the change in the relative position between the camera and the imaging object or the change in the camera posture, or the change in the relative position and the change in the camera posture;

(b) displaying warning when the relative position and/or the posture are in levels of having effects on the deterioration in the quality of images;

(c) displaying a correction amount by a gauge or an arrow to indicate which direction and angle and how much the camera has to be corrected, so as to take image appropriately; and (d) indicating the change amount of the relative position and/or the change amount of the posture by a tone at a pre-specified pitch.

Figure 5:
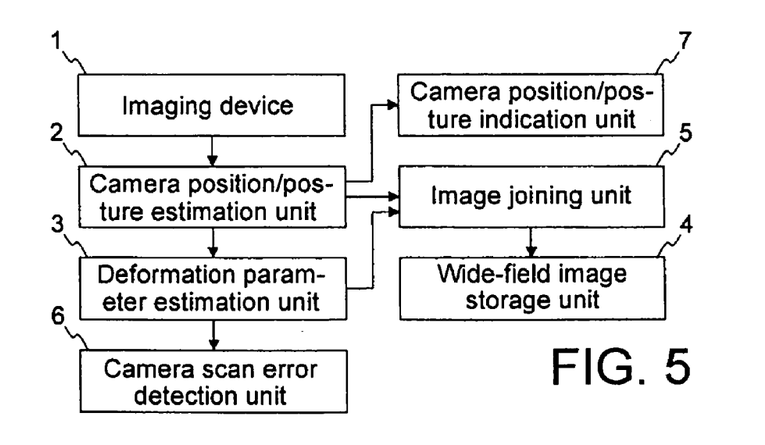
FIG. 5 is a block diagram showing a configuration of another example of the wide-field image input device according to the second embodiment.

Incidentally, when the camera scan error detection signal (camera scan error information) is not used, camera position/posture indication unit 7 may not receive the information from camera scan error detection unit 6, as shown in FIG. 5.

Figure 6:
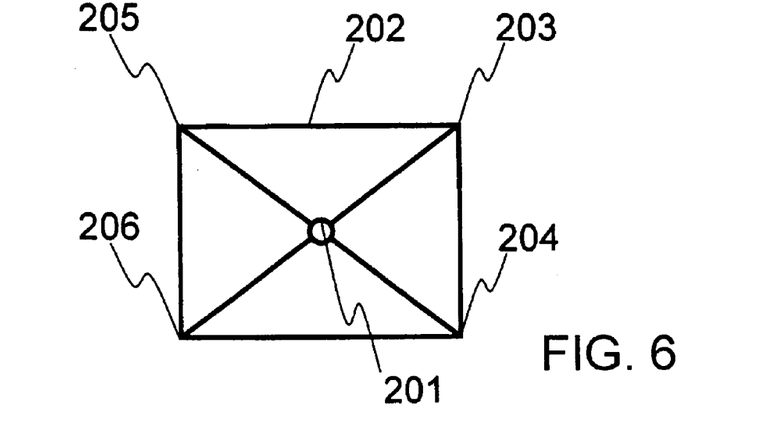
FIG. 6 is a view showing a display example for guiding a user by a camera position/posture indication unit.

Next, the operation of the wide-field image input device according to the second embodiment is explained. As an example of the case of (a) mentioned above, a display (not shown), e.g., a finder or a display unit (monitor) arranged in the digital still camera displays the orientation and posture of the camera based on the camera position/posture information supplied from camera position/posture estimation unit 7. At this time, for example, only the camera posture information may be displayed. In this case, as an example shown in FIG. 6 illustrates, when rectangle 202 corresponding to the aspect ratio of the frame, a mark showing optical center 201, and each line segment for linking each vertex of the rectangle and the optical center are drawn, the user can grasp the posture information easily. Incidentally, FIG. 6 shows the example of the camera apparatus, e.g., the digital camera of which the shape of the plane is rectangle.

Figure 7:
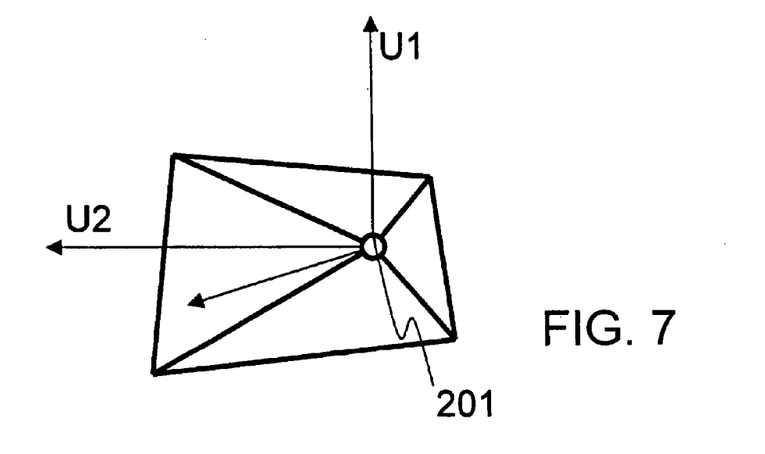
FIG. 7 is a view showing a display example for guiding a user by a camera position/posture indication unit.

When the camera is oriented in the vertical downward direction, $\{\theta_1=0, \theta_2=0, \theta_3=0\}$, the mark showing optical center 201 is displayed at the center of rectangle 202. When $\theta$ is not zero, respective vertexes 203, 204, 205, 206 of rectangle 202 are shifted and displayed in accordance with the magnitude of $\theta$ while optical center 201 is fixed, as an example shown in FIG. 7 illustrates. Since $\theta_3$ has no effect on the resolution in the image, only the vertex positions may be shifted as $U_n=U_{n+k}\cdot\theta_n$ (n=1, 2) in accordance with the magnitudes of $\theta_1$, $\theta_2$. Alternatively, concerning matrix M for representing the camera position/posture information including $\theta_3$ and distance $X_3$ to the object, the inverse matrix thereof may be obtained while $X_1$ and $X_2$ are set to 0, and the vertex positions may be shifted to positions calculated by multiplying vector $c(u_1, u_2, 1)$ obtained from the coordinates corresponding to the respective vertexes and the obtained inverse matrix. In this description, c is a parameter for controlling the scale of the rectangle display.

When the camera scan error detection information is received from camera scan error detection unit 6, the error detection information is displayed on the display screen, i.e., the finder or the display unit, or is indicated to the user by the tone, as cases (b) and (d) mentioned above, thereby easily grasping which direction the camera posture has to be corrected at that time. For example, the user corrects the camera posture in the direction such that optical center mark 202 is shifted to the center of rectangle 202, in order to eliminate the indication of the camera scan error, and performs the camera scan, in the above-mentioned example.

Figure 8:
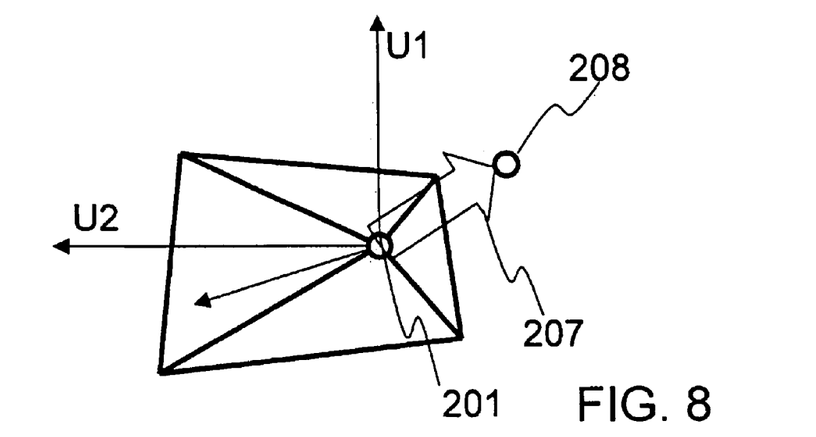
FIG. 8 is a view showing a display example for guiding a user by a camera position/posture indication unit.

Further, as one example of case (c) mentioned above, when partial images are taken without portions that are mutually overlapped because the camera scan is too fast, the direction of the frame that is finally taken while being overlapped, relative to the current frame position, is displayed by arrow 207 on the display, as shown in FIG. 8. Also, when the wide-field image is generated by the still image taking, the camera position/posture estimation is always performed during the period after the previous partial image is taken until the following partial image is taken. In this case, the distance from optical center mark 201 to tip 208 of the arrow may be changed and displayed in accordance with parallel movement amount $X_1$, $X_2$ from the frame that is finally taken while being correctly overlapped. In this way, by displaying the length that is changed, the user can easily understand how much the camera scan has to be returned in the previous scanning direction. Also, when the posture correction information of rectangle 202 is combined, the user easily grasps instinctively whether the posture has to be corrected or the position has to be corrected.

When the camera scan error is not visually indicated to the user, the pitch of the tone is changed in accordance with the level of the deviation of the camera position/posture information from the ideal state, as case (d) mentioned above. For example, the frequency of the tone may be made higher or lower in proportion to Euclidean distance of six-dimensional vector of the camera position/posture information. This may be combined with the indication aspects of (a) to (c) mentioned above. Incidentally, for example, the tone is emitted from a sound output unit built in the device to which the present invention is applied.

Figure 9:
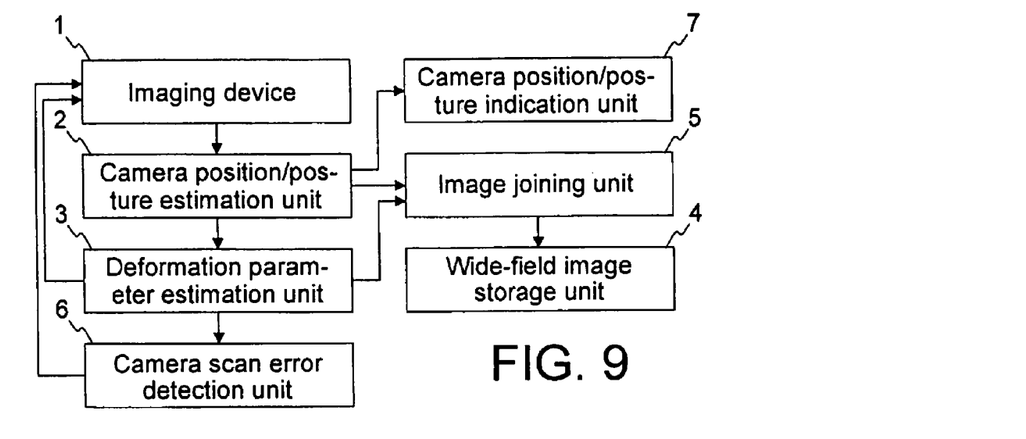
FIG. 9 is a block diagram showing a configuration of a further example of a wide-field image input device according to the second embodiment.

Further, the device may be configured such that, when overlap exists between partial images and no camera scan error is informed, an image is automatically taken even if the user gives no imaging instruction to imaging device 1. For example, imaging device 1 may receive the geometrical deformation parameter from deformation parameter estimation unit 3 and may receive the camera scan error detection information from camera scan error detection unit 6, as shown in FIG. 9. Specifically, when imaging device 1 confirms that the deformation amount of the object between partial images is within the preset value, by the geometrical parameter and no camera scan error detection information is fed from camera scan error detection unit 6, images are continuously taken automatically even if the user inputs no imaging instruction. Here, deformation parameter estimation unit 3 does not output the geometrical deformation parameter to imaging device 1, but an imaging available signal may be supplied to imaging device 1 when it is confirmed that the deformation amount of the object between the partial images is within the preset value by the geometrical deformation parameter. In this case, when the imaging available signal is supplied and no camera scan error detection information is supplied, imaging device 1 continuously takes images automatically even if the user inputs no imaging instruction.

With this arrangement, the user is not required to pay attentions to the timing for imaging and can take a wide-field image while paying only attentions to that the camera scan is correctly performed. Incidentally, the imaging instruction, for example, is to push a shutter button arranged in the camera to which the present invention is applied. A microcomputer or the like installed in the camera makes imaging device 1 take an image in accordance with pushing of the shutter button.

Third Embodiment

Figure 10:
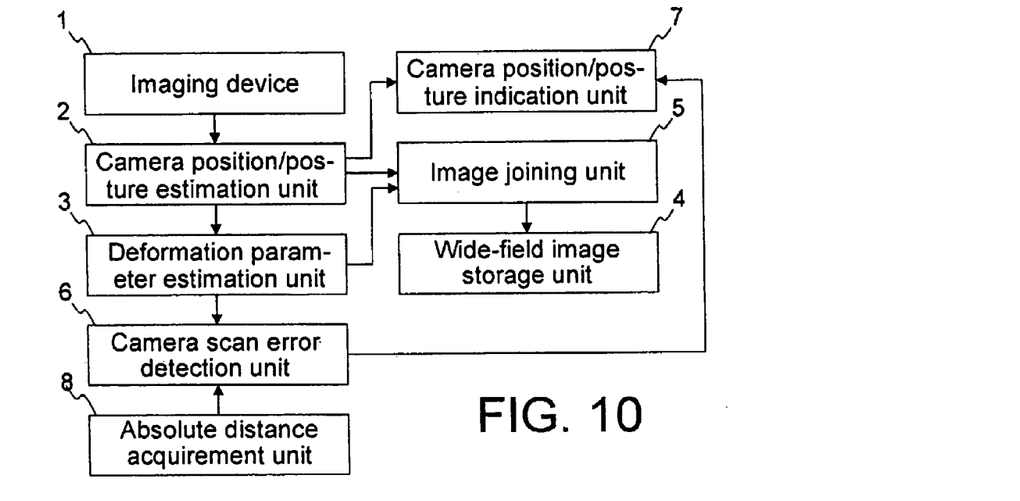
FIG. 10 is a block diagram showing a configuration of a wide-field image input device according to a third embodiment of the present invention.

FIG. 10 shows a wide-field image input device according to the third embodiment of the present invention. This wide-field image input device is configured by adding absolute distance acquirement unit 8 to the wide-field image input device according to the first or second embodiment. Absolute distance acquirement unit 8 measures the distance between the camera and the object and outputs distance information showing the measured distance to camera scan error detection unit 6. Absolute distance acquirement unit 8 like this is embodied by, for example, a distance sensor which is able to measure the distance between the camera and the object. The configuration shown in FIG. 10 is that absolute distance acquirement unit 8 is added to the wide-field image input device according to the second embodiment, however, absolute distance acquirement unit 8 may be added to the wide-field image input device according to the first embodiment shown in FIG. 3.

Also, according to the third embodiment, camera scan error detection unit 6 monitors whether imaging over the predetermined sampling frequency or predetermined resolution (number of pixels) is performed on the object surface or not, and outputs the camera scan error information to camera position/posture indication unit 7 when below.

Next, the operation of the wide-field image input device according to the third embodiment is explained.

In the above-mentioned first and second embodiments, when it is difficult to measure camera position/posture information P of the first frame in the partial image series, element $X_3$ in $P_0$ is set to 1, as one example. However, in the third embodiment, $X_3$ is measured as an absolute distance by absolute distance acquirement unit 8. Therefore, it is possible to measure the length on the object surface and how many pixels correspond to the length on the image. In other words, the resolution of the partial image can be judged in accordance with the distance information. The camera scan error is determined when the number of pixels in a unit length is below a predetermined threshold, and can be informed to the user.

As well known, the resolution in images is represented by the number of dots per one inch, i.e., 25.4 mm, and "dpi" is a unit for representing the number of dots per one inch.

For instance, an operation example is shown when a necessary resolution is specified to 400 dpi as a predetermined value. Distance d on the object surface between two points corresponding to $A_1=(x_1, y_1, 1)$, $A_2=(x_2, y_2, 1)$ on the same partial image is obtained with external parameter matrix M corresponding to $P=\{X_1, X_2, X_3, \theta_1, \theta_2, \theta_3\}$ by $$d=\|M^{-1}A_2-M^{-1}A_1\|.$$

Here, $\|\cdot\|$ represents the norm. Assuming that in three-dimensional vectors $M^{-1}A_2$ and $M^{-1}A_1$, the first and second elements are normalized by the third element. Also, assuming that distance d and coordinate values of $x_1$, $x_2$, $y_1$, $y_2$ are described using mm (millimeter) as a unit.

Then, the number of pixels per one inch on the line linking $A_1$ and $A_2$ on the partial image is represented by $$\frac{\sqrt{(x_1-x_2)^2+(y_1-y_2)^2}}{d}\times 25.4.$$

The camera scan has an error when it is below 400. The calculation like this is applied to each partial image or the frame image between imaging and imaging, thereby detecting a scan error.

Incidentally, assuming that 400 dpi is specified, similarly to the first embodiment, no notification is given when it is below 400 dpi, but notification is given when it is below a value which is larger than the specified value by a preset value (for example, 440), thereby preventing failure of imaging. The operations of the other processing units are similar to those of the other embodiments.

Fourth Embodiment

Figure 11:
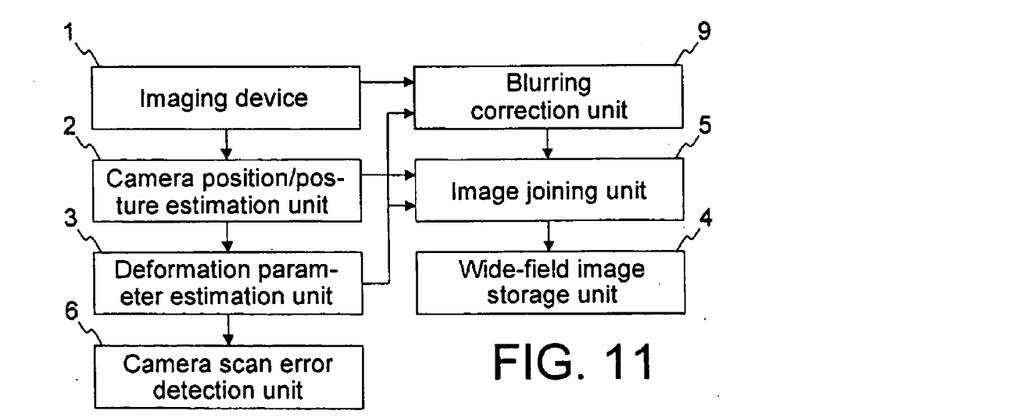
FIG. 11 is a block diagram showing a configuration of a wide-field image input device according to a fourth embodiment of the present invention.

FIG. 11 shows a wide-field image input device according to the fourth embodiment of the present invention. The wide-field image input device is configured by adding blurring correction unit 9 to the wide-field image input device according to the first embodiment. Blurring correction unit 9 receives the camera position/posture information supplied from camera position/posture estimation unit 2 as an input, estimates a blurring function included in the partial image taken by imaging device 1, performs the blurring correction to the partial image supplied from imaging device 1 in accordance with the estimated blurring function, and outputs it to image joining unit 5.

Next, the operation of this wide-field image input device is explained.

Blurring correction unit 9 measures the moving speed of pixels on the image with projection transformation matrix H supplied from deformation parameter estimation unit 3. For example, it is calculated by H that one point on the image shifts to which coordinate in the following frame, and the distance between them is set to two-dimensional vector $D=(D_x, D_y)$. When the time interval used to take two frames is set as T, the speed is represented by D/T. For example, assuming two-dimensional normal distribution $N(0, \Sigma)$, the blurring function may be $$\sum = \begin{bmatrix} kS(D_x/T)^2 & kS(D_x/T)(D_y/T) \\ kS(D_x/T)(D_y/T) & kS(D_y/T)^2 \end{bmatrix},$$

where kS is a proportionality constant. When the shutter speed of the camera into which the wide-field image input method of the third embodiment is incorporated is known, the shutter speed may be used as S and may be reflected on the calculation of $\Sigma$.

As an reconstruction filter for removing blurring, for example, $$K=N/(|N|2+\Gamma)$$

is used. $\Gamma$ is a preset constant. All the partial image series input from imaging device 1 passes through the reconstruction filter, and then is fed to image joining unit 5. The processes in the other processing units are similar to those of the other embodiments.

As described above, the preferred embodiments of the present invention are explained, and the following examples can be considered as modified examples of these embodiments. For example, in the wide-field image input device according to each of the above-mentioned embodiments, when the initial camera posture is unknown, image joining unit 5 may be configured to perform a process of obtaining the posture information from the series of partial images, obtaining an object orientation suitable for ex post facto viewing the object, and adjusting the orientation of the joined image in accordance with the object orientation.

Also, in the wide-field image input device according to the first, second, and third embodiments, posture information $\{\theta_1, \theta_2, \theta_3\}$ out of camera position/posture information $P_0$ corresponding to the first frame can be calculated after taking two or more frames by the method proposed by Zelnik-Manor and Irani (Zelnik-Manor and Irani, "Multi-Frame Estimation of Planar Motion," *IEEE Transactions on Pattern Analysis and Machine Learning*, Vol. 22, No. 10, (2000)). In the first frame, $P_0$=[0, 0, 1, 0, 0, 0] is assumed, $P_0$ is set to [0, 0, 1, $\theta_1$, $\theta_2$, $\theta_3$] after imaging several frames, and is corrected by corresponding external parameter matrix $M_0$ to perform display, thereby monitoring the posture further correctly.

Also, in imaging the partial image series, $P_0$=[0, 0, 1, 0, 0, 0] is set, and $P_0$ is corrected to [0, 0, 1, $\theta_1$, $\theta_2$, $\theta_3$] after imaging all frames, thereby generating the wide-field image in which the tilt of the camera in the first frame is corrected. Also, the joining process may be not started until the initial camera posture is calculated with a preset accuracy, and the imaging for joining may be started after determining the object orientation suitable for ex post facto viewing the object based on the obtained posture information.

Further, when the process by camera position/posture estimation unit 2 ends in failure, image joining unit 5 suspends joined images before the failure and starts to generate another new joined image. When the finish of the acquirement operation for the final partial image is notified from imaging device 1, mutual joining process may be applied to all the joined images that are suspended before the current time, thereby restoring the joining processes that end in failure before the mutual joining process.

Incidentally, each of the above-mentioned embodiments can be applied to portable terminal equipment having an imaging function, such as a video camera; a digital still camera; a mobile telephone, PHS (Personal Handyphone System), a personal computer and PDA (Personal Data Assistance, Personal Digital Assistants) which are provided with a camera; or to an imaging device that can control an imaging range, such as an active camera and a robot.

For application to the portable terminal equipment or the imaging device, mentioned above, each processing unit except imaging device 1 and the wide-field image storage unit can be carried out by a microcomputer, specifically, by CPU that operates in accordance with programs for carrying out respective functions. The respective functions include a camera position/posture estimation function for carrying out camera position/posture estimation unit 2, a deformation parameter estimation function for carrying out deformation parameter estimation unit 3, an image joining function for carrying out image joining unit 5, a camera scan error detection function for carrying out camera scan error detection unit 6, a camera position/posture indication function for carrying out camera position/posture indication unit 7, an absolute distance acquirement function for carrying out absolute distance acquirement unit 8 together with a distance sensor and the like, and a blurring correction function for carrying out blurring correction unit 9.

Therefore, the present invention includes such a program, a storage medium and a program product stored with the program in the scope of the present invention.

INDUSTRIAL APPLICABILITY

The present invention can be applied to the above-mentioned devices, such as a video camera and a digital still camera, and to a system including the devices.

The invention claimed is:

1. A wide-field image input device that joins a series of partial images obtained by continuously imaging an imaging object by an imaging device while the imaging device is manually scanned by a user, thereby generating a wide-field image, the device comprising:
    camera position/posture estimation means for receiving a partial image series including said series of partial images, and calculating a change state of three-dimensional position and posture of said imaging device as time-series camera position/posture information;
    deformation parameter estimation means for calculating a geometrical deformation parameter between adjacent partial images in said partial image series from said camera position/posture information;
    image joining means for joining said partial images while a deformation between said partial images is corrected by using said geometrical deformation parameter so as to generate a wide-field image; and
    camera scan error detection means for detecting motion of said imaging device according to said camera position/posture information, and outputting a camera scan error detection signal when an error is detected in the motion of said imaging device.

2. The device according to claim 1, further comprising camera position/posture indication means, based on said camera position/posture information from said camera position/posture estimation means, for performing one or more of the processes consisting of:
    (a) visually indicating a change in a relative position between said imaging device and the imaging object or a change of posture of said imaging device, or the change in the relative position and the change of posture;
    (b) displaying warning when said relative position and/or said posture are in levels of having effects on deterioration in a quality of images;
    (c) visually displaying a correction amount to indicate which direction and angle and how much said imaging device is corrected for desirable imaging; and
    (d) indicating a change amount of said relative position or a change amount of the posture, or both by a tone at a pitch.

3. The device according to claim 1 or 2, further comprising: absolute distance acquirement means for measuring a distance from said imaging object and outputting distance information to said camera scan error detection means,
    wherein said camera scan error detection means is configures so as to judge a resolution of said partial image in accordance with said distance information, and to output said camera scan error signal to the camera position/posture indication means when the resolutions does not reach a predetermined value.

4. The device according to claim 3, wherein said image joining means is configured, when a initial camera posture is unknown, to obtain posture information from said partial image series, to obtain an object orientation suitable for ex post facto viewing an object, and to adjust an orientation of a joined image in accordance with the object orientation that is obtained.

5. The device according to claim 1, further comprising blurring correction means for estimating a blurring function included in a partial image taken by said imaging device based on said camera position/posture information, and for correcting said partial image supplied from said imaging device in accordance with said blurring function that is estimated to output the partial image to the image joining means.

6. A wide-field image input device comprising:
 an imaging device for continuously imaging an imaging object while the imaging device is manually scanned by a user, and for obtaining a partial image series including a series of partial images;
 camera position/posture estimation means, based on the partial image series, for calculating a change state of three-dimensional position and posture of said imaging device as time-series camera position/posture information;
 deformation parameter estimation means for calculating a geometrical deformation parameter between adjacent partial images in said partial image series from said camera position/posture information;
 image joining means for joining said partial images while a deformation between said partial images is corrected by using said geometrical deformation parameter so as to generate a wide-field image; and
 camera scan error detection means for detecting motion of said imaging device according to said camera position/posture information and outputting a camera scan error detection signal when an error is detected in the motion of said imaging device.

7. The device according to claim 6, further comprising camera position/posture indication means, based on said camera position/posture information from said camera position/posture estimation means, for performing one or more of the processes consisting of:
 (a) visually indicating a change in a relative position between said imaging device and the imaging object or a change of posture of said imaging device, or the change in the relative position and the change of posture;
 (b) displaying warning when said relative position and/or said posture are in levels of having effects on deterioration in a quality of images;
 (c) visually displaying a correction amount to indicate which direction and angle and how much said imaging device is corrected for desirable imaging; and
 (d) indicating a change amount of said relative position or a change amount of the posture, or both by a tone at a pitch.

8. The device according to claim 6 or 7, wherein said deformation parameter estimation means outputs an imaging available signal to said imaging device when a deformation amount between partial images is within a predetermined value,
 wherein said camera scan error detection means outputs said camera scan error detection signal to said imaging device, and
 wherein said imaging device is configured so as to perform imaging automatically when said imaging available signal is received and said camera scan error signal is not supplied.

9. The device according to claim 8, wherein said image joining means is configured, when a initial camera posture is unknown, to obtain posture information from said partial image series, to obtain an object orientation suitable for ex post facto viewing an object, and to adjust an orientation of a joined image in accordance with the object orientation that is obtained.

10. The device according to claim 6 or 7, further comprising:
 absolute distance acquirement means for measuring a distance from said imaging object and outputting distance information to said camera scan error detection means,
 wherein said camera scan error detection means is configured so as to judge a resolution of said partial image in accordance with said distance information, and to output said camera scan error signal to the camera position/posture indication means when the resolutions does not reach a predetermined value.

11. The device according to claim 10, wherein said image joining means is configured, when a initial camera posture is unknown, to obtain posture information from said partial image series, to obtain an object orientation suitable for ex post facto viewing an object, and to adjust an orientation of a joined image in accordance with the object orientation that is obtained.

12. The device according to claim 6, further comprising blurring correction means for estimating a blurring function included in a partial image taken by said imaging device based on said camera position/posture information, and for correcting said partial image supplied from said imaging device in accordance with said blurring function that is estimated to output the partial image to the image joining means.

13. The device according to any one of claims 1, 2, 5-7, and 12, wherein said image joining means is configured, when a initial camera posture is unknown, to obtain posture information from said partial image series, to obtain an object orientation suitable for ex post facto viewing an object, and to adjust an orientation of a joined image in accordance with the object orientation that is obtained.

14. A wide-field image input method that joins a series of partial images obtained by continuously imaging an imaging object by an imaging device while the imaging device is manually scanned by a user, thereby generating a wide-field image, the method comprising the steps of:
 receiving a partial image series including said series of partial images, and calculating a change state of three-dimensional position and posture of said imaging device as time-series camera position/posture information;
 calculating a geometrical deformation parameter between adjacent partial images in said partial image series from said camera position/posture information;
 joining said partial images while a deformation between the partial images is corrected by using said geometrical deformation parameter so as to generate a wide-field image; and
 detecting motion of said imaging device according to said camera position/posture information, and outputting a camera scan error detection signal when an error is detected in the motion of said imaging device.

* * * * *